UNITED STATES PATENT OFFICE.

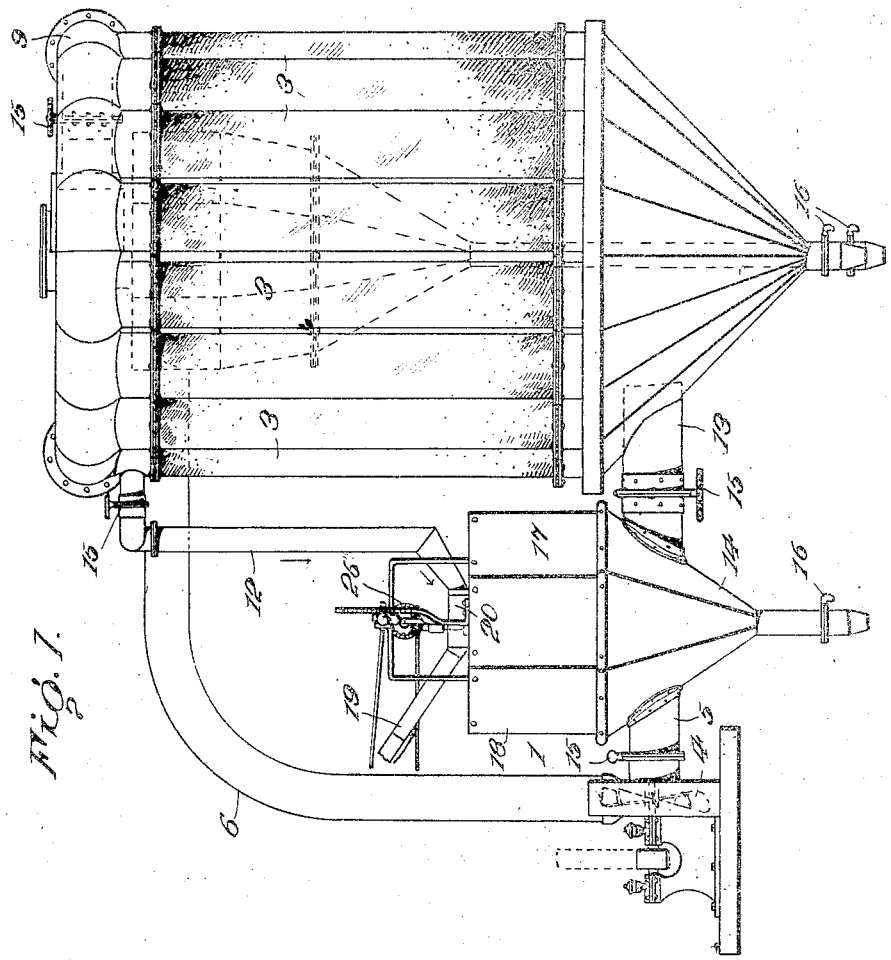

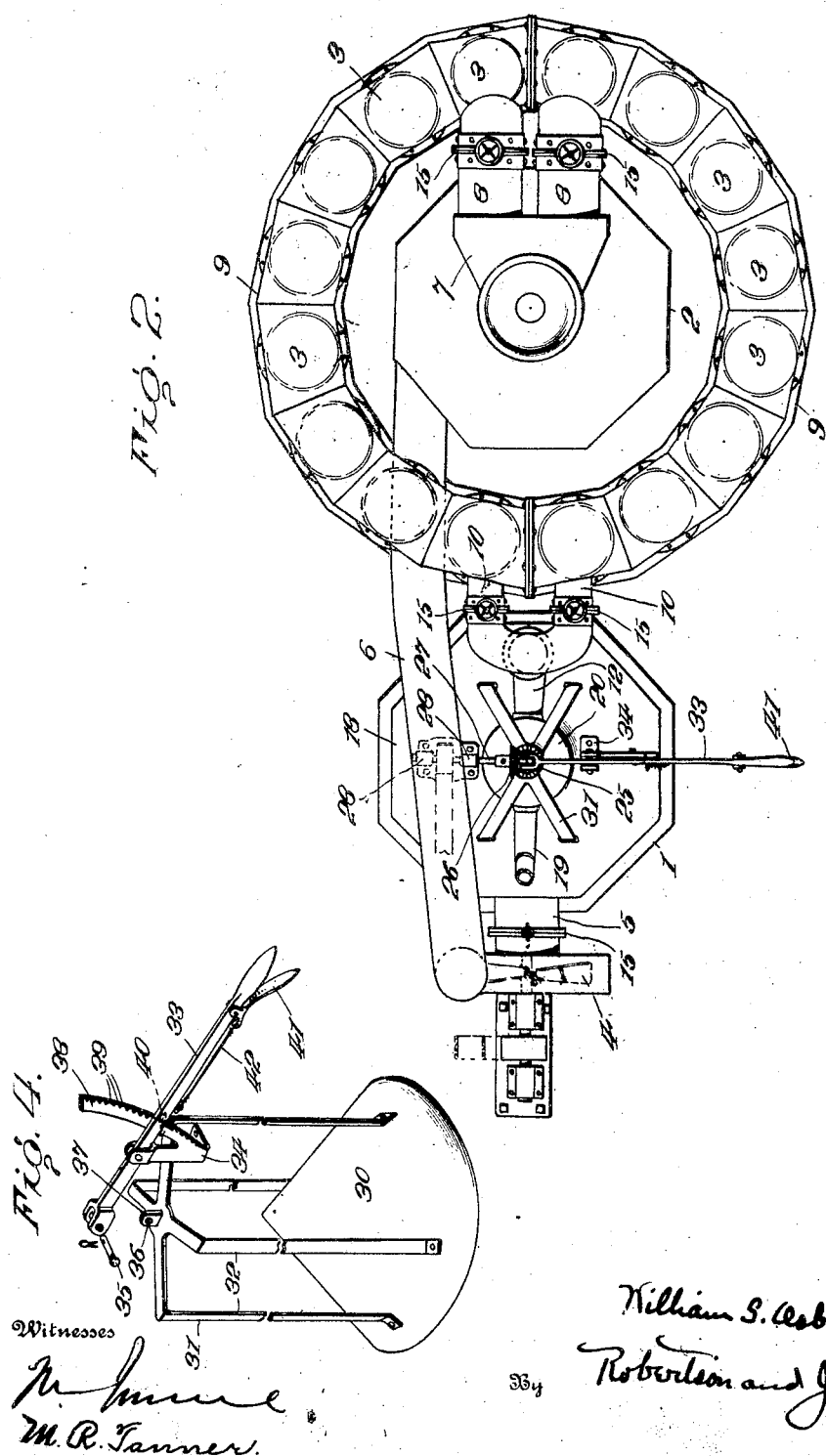

WILLIAM S. OSBORNE, OF MARIETTA, PENNSYLVANIA.

AIR AND DUST SEPARATOR.

No. 880,161. Specification of Letters Patent. Patented Feb. 25, 1908.

Application filed August 16, 1905. Serial No. 374,385.

*To all whom it may concern:*

Be it known that I, WILLIAM S. OSBORNE, a citizen of the United States, and a resident of Marietta, county of Lancaster, State of Pennsylvania, have invented certain new and useful Improvements in Air and Dust Separators, of which the following is a specification.

My invention relates to an air separator for use in grading materials whose particles are not of uniform fineness, this grading being effected by causing to pass through the separator a current of air which carries with it, out of the separator, the finer and lighter particles, while allowing the heavier and coarser ones to fall to the bottom of the separator from which they are readily removed.

While this improved separator may of course be used in various relations and in different systems, in fact wherever it can perform its functions, it is nevertheless primarily intended to be incorporated in such a system as that described in my former patent No. 764,671, issued July 12, 1904, to which reference should be had for a full description of the said system. The separator B illustrated in said patent as a part of the system is more minutely described in Patent No. 744,390, issued to Edwin C. Bryant and myself, and recourse should be had to this patent for complete information regarding it. The separator herein described is an improvement on the separator of these patents, insuring a thorough diffusion or scattering of the material through the air and the prompt arrest and separation of the coarser particles. It has many other advantages among which is internal adjustability of both the feed and the air current. This is a more immediate adjustment and secures a more exact control than is attained by the valves in the connections on which formerly reliance was had to effect a like result. While these valves are still used, the nice adjustments are secured chiefly by varying the position of the upper cone with respect to the lower.

Before proceeding to describe the separator, however, the system referred to will be briefly explained. It consists of a separator, a dust collector, a series of dust collecting tubes, a fan located between said separator and said dust collector, and suitable connections to enable the fan to draw air from said collector over said tubes and through said separator and to force it back into said collector, thus causing it to traverse a substantially closed circuit. Means are of course provided for feeding material to the system and for removing it therefrom. Suitable governing means, as valves, are also provided. Material to be graded is delivered to the separator where an initial separation takes place, the coarser particles falling into a receptacle below the separator, and the finer being carried to the dust collector where a second separation takes place. The finest particles are carried on over the collecting tubes where the final separation occurs.

Referring to the drawings: Figure 1, is a side elevation of the grading system in which I have shown my separator as incorporated. Fig. 2, is a plan of the same. Fig. 3, is a sectional elevation through my separator and adjacent elements. Fig. 4, is a perspective view of the adjustable cone which is a detail of the separator, showing the operating lever, adjusting rack, etc., the parts being shown for clearness somewhat out of their assembled positions.

1, is the separator, 2 the dust collector, 3 the collecting tubes and 4 the fan. The connections are indicated as follows: 5 is the pipe connecting the separator with the eye of the fan; 6 is the connection between the delivery side of the fan and the dust collector; 7 is a Y leading from the dust collector and having arms 8, 8 leading each to a pipe 9, connecting each arm with a series comprising half the dust collecting tubes which are conveniently but not necessarily arranged in a circle; 10, 10 are the arms of a Y, 11, leading from the pipe 9 to the pipe 12 which completes the circuit to the separator and so to the fan, and 13 is a pipe joining the hopper of the dust collecting tubes 3 with the hopper 14 of the separator. Valves or dampers 15, as shown, are located in each branch of both Y's and in the pipes 5 and 13. In the outlet passages of the various receptacles are slide valves 16.

The operation of this system has been stated above in general terms, and since full details as to the nature of the system and as to its operation may be learned from Patent No. 746,671 above referred to, no further statement of its operation is necessary here.

The separator 1 has a casing 17, which for ease of description may be regarded as having two parts, the octagonal box 18 above, and the hopper 14 below, on which the box 18 rests. The first of these serves to support the end of the feed pipe 19 and that of the air pipe 12, both of which are preferably inclined and enter a round hollow boss 20, concentric with the casing and sufficiently elevated above the top of the box 18 to allow space for this purpose. Corresponding to this boss, and if desired a part of it, is an annular flange or wall 21 which projects down a short distance from the top of the box 18 forming a baffle. The air pipe 12 constitutes an air inlet into the boss 20, and the chamber formed by the boss 20 and the wall 21 constitutes an air inlet into the casing 17. The feed-pipe 19 is continued into the space inclosed by said boss and wall and has at its extremity a short vertical portion 22, which is concentric with the boss 20. Located centrally of the casing, boss, and portion 22 of feed pipe 19 is a shaft 23, on which is splined a disk 24, the diameter of which is preferably the same or slightly greater than the outer diameter of the vertical portion 22 of feed pipe 19. The portion 22 projects preferably about three inches below the top of box 18 and has been advantageously given a diameter of six inches. The disk 24 is best adjusted sufficiently below the end of the vertical portion 22 to make the area between these elements equal to the area of the pipe. At the top of shaft 23, is a bevel gear 25 with which meshes a similar gear 26 located on a shaft 27 supported in suitable bearings 28 on the top of the casing. This shaft is driven by any desired means.

In order to allow the disk to be adjusted from the outside of the separator, instead of from within by the movement of the disk along the shaft, the said shaft 23 may be arranged to slide through the gear 25, and be retained in its adjustment by any suitable means as a set screw 29 on the hub of the gear wheel.

The wall or flange 21 projects down somewhat below the disk to act as a stop for the heavier particles which will be whirled with great force outward against it by the rapidly rotating disk.

Within the separator is an adjustable deflector 30, preferably a cone or pyramid, which is part of the controlling and separating mechanism. This cone is supported by a frame 31, having legs 32, extending down through the top of the casing and secured to the cone. A lever 33 fulcrumed on a support 34 on the top of the casing upholds the frame and cone, being loosely attached to the former, as by a pivot pin 35, as shown, passing through an eye 36 on a lug 37 central of the frame. 38 is a rack provided with teeth or holes 39 with which the locking detent 40 controlled by the hand lever 41, and connection 42, coöperates in a well known manner, to retain any desired adjustment. Stop pins capable of being placed in holes in a bar may be used instead of the rack and detent, though the latter is more convenient.

Within the hopper 14 of the casing the pipe 5 which leads from the separator to the fan is brought to the center of the casing and has a vertical portion 43 which is concentric with the casing and whose extreme end is surrounded by a slanting collar 44 forming a truncated cone or pyramid, the pitch of which is less than that of the adjustable cone 30 above it with which it forms in effect a valve. This difference in pitch results in lessening the force of the air currents as the space between the surfaces of the two cones becomes greater, as the air nears the pipe 5. The effect is to permit particles which have been swept between the cones by the strength of the currents of air, but which are too coarse and heavy to be properly carried over into the dust collector, to drop down onto the lower cone as the current being diffused in the larger space weakens, and to slide back down the surface of the said cone into the hopper of the separator. Of course the cones might have the same angle but that is a construction greatly inferior to the one just described.

The operation of my separator is as follows: The fan 4 being in motion creates a current of air through the separator, which current enters boss 20, above the vertical portion 22 of the feed pipe 19, and leaves it by passing between the two cones 30 and 44 and out through pipe 5. The disk 24, is rotated rapidly and the material to be graded is fed to it through pipe 19. Under these circumstances the disk throws the material violently outward, scattering it and giving it a swirling motion which it imparts to some extent to the air current. The particles of the material under treatment, particularly the heavier and coarser ones are hurled against the wall or flange 21, from which they drop onto the slanting surface of the upper cone 30, down which they tend to slide, and being too heavy to be carried by the air current through the outlet, fall at length into the hopper 14 of the separator. The finer particles are carried with the air current out of the separator by pipe 5. The fineness of the products is regulated chiefly by adjusting the upper cone toward or away from the lower cone. As the opening between the two is decreased the force of the air current increases and the particles carried with it out of the separator are coarser and heavier. Correspondingly, increase in the size of the opening decreases the strength of the current and a finer product is secured.

The part played in the operation of the separators by the difference in the angles of the cones has already been sufficiently described. The uniformity in grading secured by this construction should, however, be noted.

Simplicity, ease of operation and control, and nicety of adjustment are among the conspicuous characteristics of my separator.

By using the terms "air", "air inlet" etc., I do not mean to imply that the apparatus is to be used only with air. On the contrary any suitable fluid may be employed. Moreover I do not mean to imply by the language just quoted or by anything in the above specification, that the material may not be introduced along with the air, or that a separate feed inlet must always be used.

Having described the nature and objects of the invention, what I claim as new and desire to secure by Letters Patent is:—

1. A separator having in combination, a casing, two concentric upwardly pointing cones, one of which sets into the other, an inlet for material to be separated located above said cones, an inlet for air, means for introducing the material into a current of air and for mingling it therewith at the admission of both into the casing, and means for causing a current of air to flow inward between the cones and downward to carry the lighter particles of material, substantially as described.

2. In apparatus of the character described, in combination, a casing, a central hollow boss on the top thereof having a wall projecting down therefrom into the casing, a feed pipe entering said boss and having its opening slightly above the lower edge of the wall of the boss, a disk rotatably supported slightly below the bottom of the feed pipe to scatter the material against said wall and into the casing, a conical deflector below said disk, means to admit air above said disk, a second conical member below the first and coöperating therewith, an air outlet from the space between said cones and means for relatively adjusting the two, substantially as described.

3. In a separator, in combination, a casing, an air inlet, and an air outlet from said casing, a conical collar surrounding said outlet, a cone coöperating with said collar to control the outlet, a skeleton frame projecting through the casing and supporting said cone, and means without the casing for adjusting the position of said frame, substantially as described.

4. A separator, having, in combination, two concentric upwardly pointing cones one of which sets into the other, the upper cone having steeper sides than the lower cone, means for feeding material to be separated above the upper cone, and means for causing a current of air to flow downward and outward over the upper cone and then inward between the cones to carry the lighter particles of material, substantially as described.

5. A separator, having, in combination, a truncated upwardly pointing cone provided with an air inlet at its summit, means for causing a current of air to pass into the air inlet, a complete upwardly pointing cone concentric with the truncated cone and setting over it, the pitch of the latter cone being greater than that of the truncated cone, and means for delivering material and a current of air to the upper surface of the upper cone, substantially as described.

6. In a separator, an inlet for air and material, a complete cone under said inlet, a second cone under the first cone and projecting up into it, an outlet from the casing leading from the center of the lower cone, and means to vary the distance between said cones to control the said outlet, substantially as described.

7. In a separator, an air inlet, a feed inlet distinct from the air inlet, a complete cone below said inlets to deflect material, a second cone below the first and having its surface less inclined than that of the upper cone, an outlet from the space between the cones and means for drawing air laden with material between the outer edges of said cones along the upper surface of said lower cone and downwardly through said outlet, substantially as described.

8. In apparatus of the character described, a casing, an inverted cylindrical chamber open at its bottom, an air inlet into said chamber above its bottom, a separate feed inlet below said air inlet and concentric with said cylinder, pneumatic separating means below the open bottom of said chamber, means for producing a down draft through said casing, and means immediately below said feed inlet to throw material against the sides of said chamber, substantially as described.

9. In apparatus of the character described, a casing, an inverted cylindrical chamber open at its bottom to said casing and located in the top thereof, an air inlet into said chamber, a separate feed inlet concentric with said cylinder and below the air inlet, means for producing a down draft through said casing, a rotatable disk below the feed inlet to diffuse material into the current of air at the moment both air and material pass from the chamber into the casing, and means for rotating said disk, substantially as described.

10. In a separator, an air inlet, a feed inlet distinct from the air inlet, a complete cone below the feed inlet to deflect material, a second cone below the first and having its surface less inclined than that of the upper cone, an outlet from the space between the cones, means for drawing air laden with material between the outer edges of said cones along the upper surface of said lower cone and downwardly through said outlet and means to vary the distance between the cones to control the said outlet, substantially as described.

Signed by me this 15 day of August 1905.

WILLIAM S. OSBORNE.

Witnesses:
H. REA ENGLE,
G. W. OSBORNE.